Figure 1:
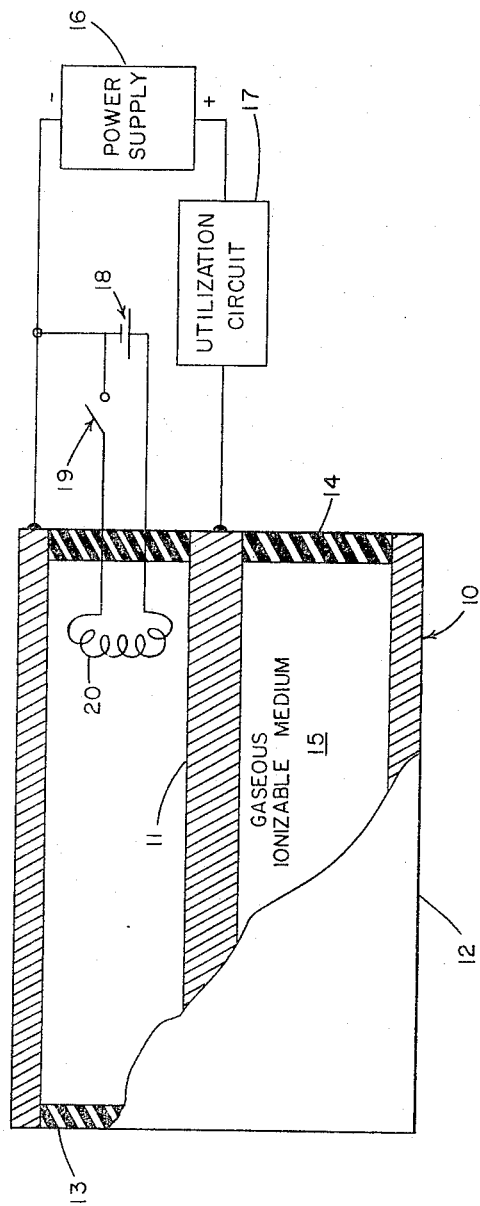

May 2, 1967 R. S. BRODSKY 3,317,823
SELF-CHECKING IONIZATION CHAMBER TYPE RADIATION DETECTOR
Filed April 8, 1963 2 Sheets-Sheet 1

INVENTOR.
ROBERT S. BRODSKY
BY

United States Patent Office 3,317,823
Patented May 2, 1967

3,317,823
SELF-CHECKING IONIZATION CHAMBER
TYPE RADIATION DETECTOR
Robert S. Brodsky, Annandale, Va., assignor to the United States of America as represented by the United States Atomic Energy Commission
Filed Apr. 8, 1963, Ser. No. 271,530
1 Claim. (Cl. 324—33)

This invention relates to a self-checking ionization chamber radiation detector.

In the detection and measurement of radiation, it has always been a problem first, to determine if a particular radiation detector ionization chamber is operating, second, to determine if the sensing and measuring devices associated with the radiation detector ionization chamber are operating and third, to calibrate the detector ionization chamber and the sensing and measuring devices. This is particularly a problem in the operation of a nuclear reactor power plant. In a nuclear power reactor, multiple ranges of instrumentation, usually ionization chambers, are used to follow the change of neutron level in the reactor from shutdown conditions to 100% power. Generally, these ranges of instrumentation are called source, intermediate and power level instruments. In an ordinary startup procedure, the various neutron level detection instruments overlap the next level instrument so that the operation of the succeeding level's instrumentation can be confirmed. However, if there is a startup accident, this method of confirming the operation of the instruments is not feasible and hence protective devices connected to the higher level instrumentation may not be functioning and core damage may result.

Periodic maintenance checks of detection instruments is desirable but, if between the time of checking the instruments and their actual use some instrument malfunction occurred combined with a reactor transient, extensive damage to a reactor or to personnel could occur. Prior attempts to check radiation detection instruments on site have had other lamitations such as expensive radiation shielding to protect personnel and/or extensive additional electronic circuitry. Some devices do not provide assurance that the detector ionization chamber itself is functioning properly but merely the sensing and measuring circuits, while, at the same time, having one or more of the above enumerated limitations.

Accordingly, it is an object of this invention to provide a new and improved self-checking ionization chamber radiation detector.

It is also an object of this invention to provide a self-checking device which will check and/or calibrate any ionization chamber and its circuitry by a simple modification of the chamber.

It is another object of this invention to provide a self-checking ionization chamber radiation detector which does not need any additional protective equipment for personnel.

It is a further object of this invention to provide a self-checking ionization chamber radiation detector which can be checked and/or calibrated on site.

Still further, it is an object of this invention to provide a self-checking ionization chamber radiation detector which does not require any additional electronic equipment than that normally available.

Various other objects and advantages will appear from the following description of one embodiment of the invention, and the most novel features will be particularly pointed out hereinafter in connection with the appended claim.

In accordance with the present invention, a controllable source of electrons is disposed within an ionization chamber and the source turned on only when a check or calibration of the detector ionization chamber and/or its circuitry is made. The source, when energized, emits electrons ionizing the surrounding gas thereby providing a current in the measuring and utilization circuitry.

Figure 2:
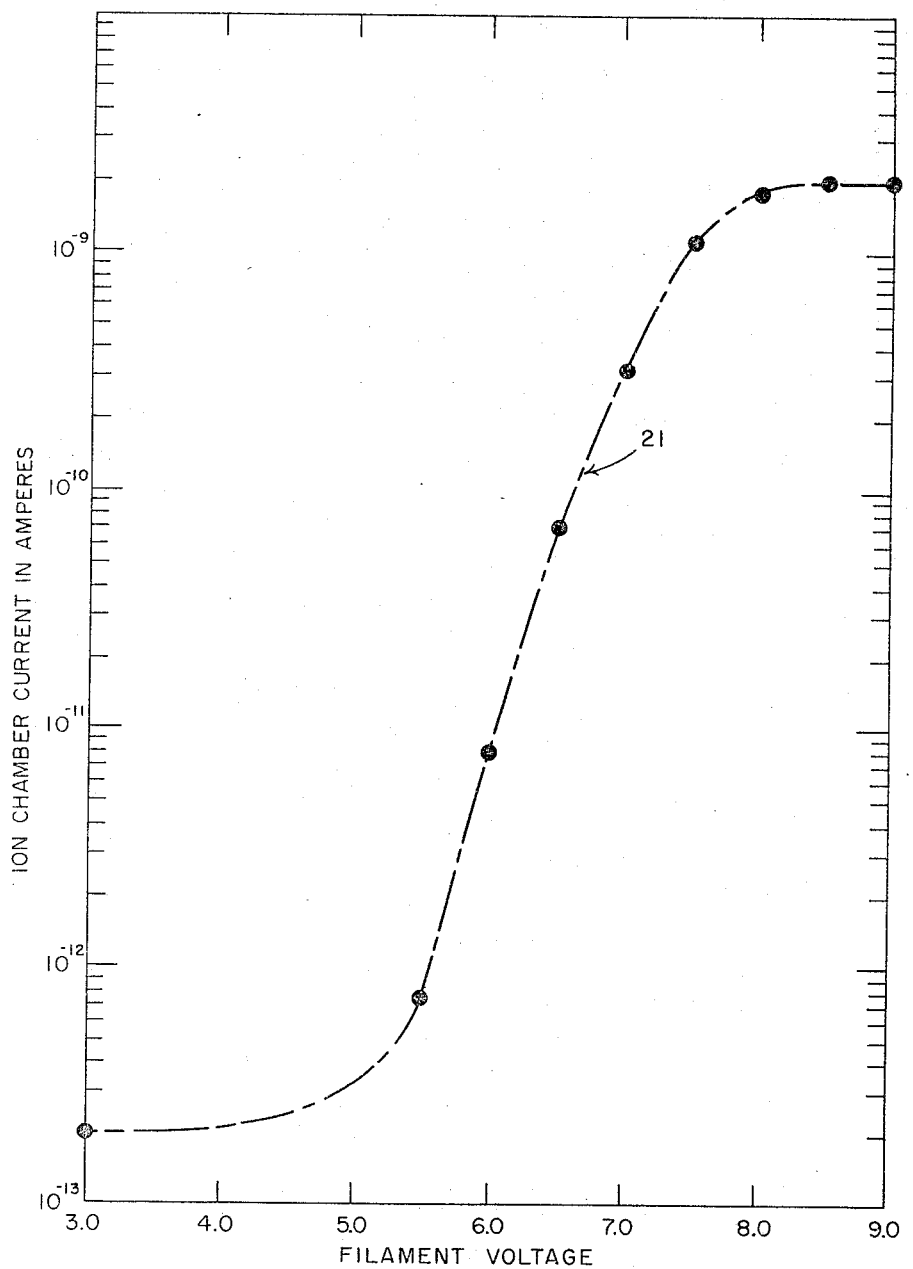

For a better understanding of the invention, reference may be had to the accompanying drawing in which:

FIGURE 1 is a partially cut out schematic view of a preferred embodiment of this invention, and FIGURE 2 is a graph illustrating a checking and calibrating curve of an ionization chamber which embodies this invention.

Referring to FIG. 1, a radiation detector ionization chamber 10 formed by an inner cylindrical electrode 11, an outer cylindrical electrode 12 and cylindrical insulators 13 and 14 encloses a gaseous ionizable medium 15. A high voltage direct current power supply 16 and a utilization circuit 17 are connected across electrodes 11 and 12 in a manner well known in the art. The utilization circuit 17 may be a simple ammeter, a personnel warning system or a nuclear power reactor scram circuit. In this embodiment, the negative terminal of power supply 16 is connected to the outer electrode 12.

An electron emissive filament cathode 20 is disposed between electrodes 11 and 12 within radiation detector ionization chamber 10 and connected across to the power supply 18 through switch 19. One side of filament cathode 20 is connected to the negative terminal of power supply 16.

In operation, power supply 18 heats filament cathode 20 to its electron emissive temperature when switch 19 is closed. The electrons from filament 20 ionize the surrounding gas in medium 15 providing a current to the inner electrode 11 energizing utilization circuit 17. In FIG. 2, a resultant curve 21 of the operation of a typical ionization chamber radiation detector embodying this invention is shown as a plot of filament voltage and ion-chamber current.

The measurements depicted in FIG. 2 were made on an air-equivalent gamma ionization chamber detector. A filament cathode wire size and material was chosen which would draw a limited amount of current so as to operate within the limits of existing power supplies utilized by ionization chamber radiation detectors. In this manner, the chamber was operated within the limits of the equipment previously used without modification of that equipment.

The slope of curve 21 in FIG. 2 is a very steep leveling off at a definite maximum current. At a filament voltage characteristic of the physical parameters of the filament and the ion chamber, with its applied voltage, the ion chamber current reaches this maximum as a result of space charge effects around the electron emitting body. For a given filament and ion chamber size, the only way to increase the ion chamber current above this maximum is by increasing the potential gradient inside the chamber. Thus for a particular filament and ion chamber voltage, this limiting current is reasonably consistent and can be used both for checking the operation of the chamber and for calibration of the system.

Any ionization chamber detector can be modified in accordance with this invention by adding only one low voltage line to the chamber and a filament cathode without changing existing power supplies or equipment so as to incorporate the self-checking and calibrating advantages of this invention. The radiation detector can then be checked and calibrated at any time on site by switching on the filament power supply and heating the filament and cathode to its electron emissive temperature.

It will be understood that various changes in the details, materials, and arrangements of the parts, which have been herein described and illustrated in order to explain the nature of the invention may be made by those

What is claimed is:

A self-checking ionization chamber radiation detector comprising:
  (a) an ionization chamber sealing in a gaseous ionizable medium, said ionization chamber formed by a first and second electrode separated by an insulating structure therebetween,
  (b) a utilization circuit connected to said second electrode,
  (c) a high voltage direct current power supply connected between said first electrode and said utilization circuit,
  (d) a normally nonemitting electron source disposed between the first and second electrodes within said ionization chamber, said electron source being an added electron emissive cathode filament,
  (e) means for energizing said electron source consisting of a low voltage power supply for heating said cathode to its electron emissive temperature, and
  (f) switch means for holding said electron source in either its normally non-emitting state or for connecting said electron source to said heating means, said heated filament cathode emitting electrons which ionize the surrounding gaseous medium thereby providing a checking current in the utilization circuit.

References Cited by the Examiner

UNITED STATES PATENTS

| | | | |
|---|---|---|---|
| 1,334,143 | 3/1920 | Dushman | 324—33 |
| 2,523,779 | 9/1950 | Relyea | 324—33 X |
| 2,537,775 | 1/1951 | MacNeille | 324—33 |
| 2,609,423 | 9/1952 | Townsend | 324—33 |
| 2,750,560 | 6/1956 | Miles | 324—33 |
| 2,758,233 | 8/1956 | Nelson. | |
| 2,884,550 | 4/1959 | Lafferty | 324—33 X |
| 3,001,128 | 9/1961 | Nottingham | 324—33 |
| 3,244,969 | 5/1966 | Herb et al. | 324—33 |

WALTER L. CARLSON, *Primary Examiner.*

FREDERICK M. STRADER, *Examiner.*

C. F. ROBERTS, *Assistant Examiner.*